US008511359B2

(12) United States Patent
Perlman

(10) Patent No.: US 8,511,359 B2
(45) Date of Patent: Aug. 20, 2013

(54) LAYUP MANDREL HAVING CHANGEABLE SHAPE AND METHOD OF USING THE SAME

(75) Inventor: David Lynn Perlman, Queen Creek, AZ (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 12/888,717

(22) Filed: Sep. 23, 2010

(65) Prior Publication Data

US 2012/0073732 A1 Mar. 29, 2012

(51) Int. Cl.
*B29D 30/24* (2006.01)

(52) U.S. Cl.
USPC ........... 156/415; 156/169; 156/173; 156/175; 156/414; 156/417; 156/418; 156/419; 156/420; 156/425; 156/429; 70/71; 249/175; 249/178; 249/179; 249/180; 425/31; 425/49; 425/51; 425/52; 425/392; 425/393; 425/403

(58) Field of Classification Search
USPC ................. 156/414, 415, 417, 420, 169, 173, 156/175, 418, 419, 425, 429; 249/175, 178, 249/179, 180; 425/31, 49, 51, 52, 392, 393, 425/403
See application file for complete search history.

(56) References Cited

U.S. PATENT DOCUMENTS

| 3,978,256 A | 8/1976 | James |
|---|---|---|
| 3,988,103 A | 10/1976 | Hoffmeister |
| 4,278,490 A | 7/1981 | Pistole |
| 4,354,645 A | 10/1982 | Glavas |
| 4,459,171 A | 7/1984 | McKinney |
| 4,582,275 A | 4/1986 | Ives |
| 4,754,543 A | 7/1988 | Spivy |
| 5,226,470 A | 7/1993 | Lemoine |
| 5,327,765 A | 7/1994 | Weykamp |
| 5,482,340 A | 1/1996 | Jensen |
| 6,955,283 B2 | 10/2005 | Kendall |
| 7,083,698 B2 | 8/2006 | Engwall |
| 7,138,031 B2 | 11/2006 | Erickson |
| 7,166,251 B2 | 1/2007 | Blankinship |
| 7,278,198 B2 | 10/2007 | Olson |
| 7,293,737 B2 | 11/2007 | Engwall |
| 7,357,166 B2 | 4/2008 | Pham |
| 7,429,172 B2 | 9/2008 | Chotard |
| 7,571,527 B2 | 8/2009 | Burnett |
| 7,588,655 B2 | 9/2009 | Pham |
| 7,694,412 B2 | 4/2010 | Absalonson |
| 7,765,703 B2 | 8/2010 | Buckus |
| 8,091,603 B2 | 1/2012 | Pham et al. |
| 2004/0050908 A1 | 3/2004 | Kendall |
| 2005/0039844 A1 | 2/2005 | Engwall |

(Continued)

FOREIGN PATENT DOCUMENTS

| DE | 742682 C | 12/1943 |
|---|---|---|
| DE | 4234002 A1 | 4/1994 |

(Continued)

OTHER PUBLICATIONS

International Search Report, dated Nov. 16, 2011, regarding Application No. PCT/US2011/048697 (WO2012039870), 4 pages.

*Primary Examiner* — Katarzyna Wyrozebski Lee
*Assistant Examiner* — Joshel Rivera
(74) *Attorney, Agent, or Firm* — Yee & Associates, P.C.

(57) ABSTRACT

A layup mandrel includes a shell having a tool surface on which plies may be laid up. The shape of the shell is changed by an actuator.

22 Claims, 7 Drawing Sheets

(56) References Cited

U.S. PATENT DOCUMENTS

| | | |
|---|---|---|
| 2005/0127566 A1 | 6/2005 | Chotard |
| 2006/0108057 A1 | 5/2006 | Pham |
| 2006/0145049 A1 | 7/2006 | Blankinship |
| 2006/0225265 A1 | 10/2006 | Burnett |
| 2009/0044914 A1 | 2/2009 | Pham |
| 2010/0009124 A1 | 1/2010 | Robins |
| 2010/0139857 A1 | 6/2010 | Pham |

FOREIGN PATENT DOCUMENTS

| | | |
|---|---|---|
| EP | 1767325 A2 | 3/2007 |
| WO | PCT/US2011/048697 | 8/2011 |
| WO | 2012039870 A1 | 3/2012 |

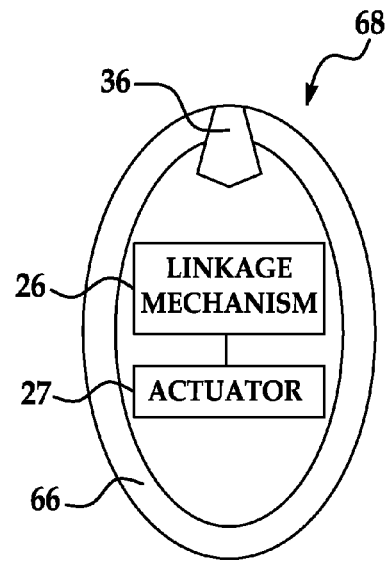
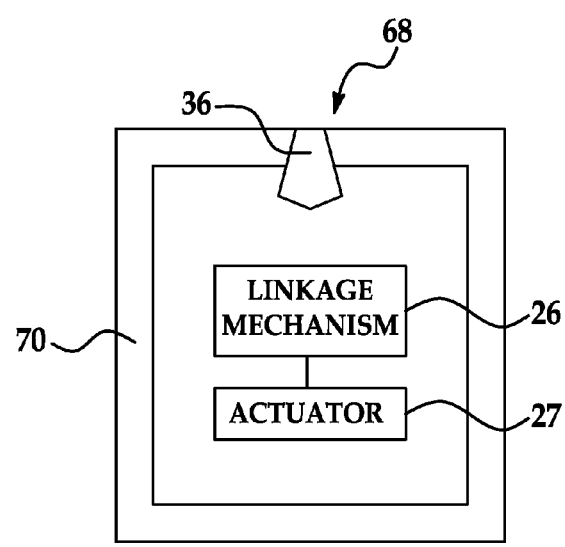
FIG. 11       FIG. 12
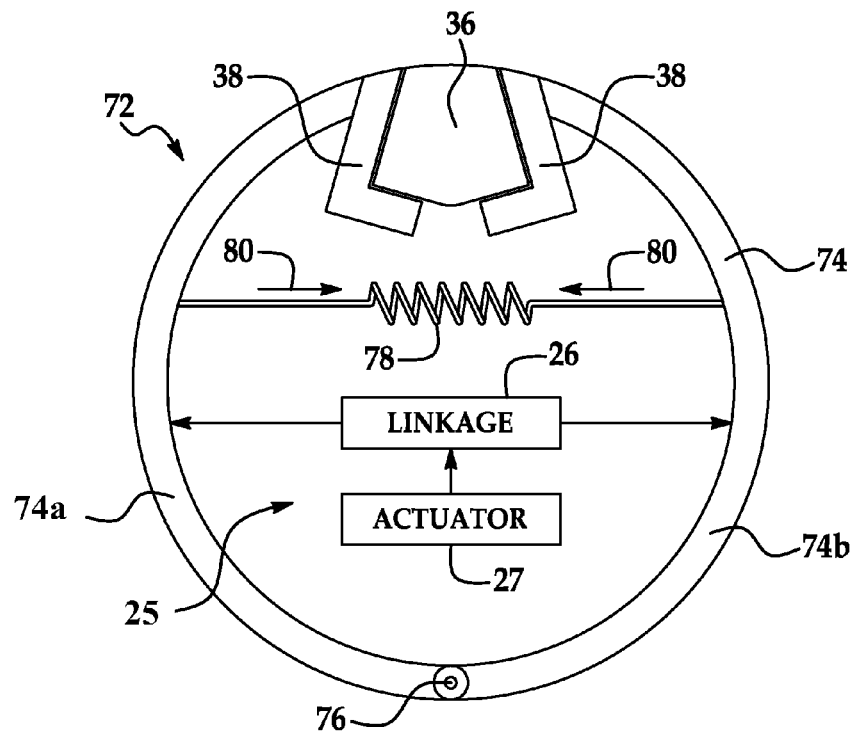
FIG. 13

LAYUP MANDREL HAVING CHANGEABLE SHAPE AND METHOD OF USING THE SAME

TECHNICAL FIELD

This disclosure generally relates to tooling apparatus, and deals more particularly with a mandrel having a changeable shape used to form parts such as composite layups.

BACKGROUND

Shaped laminated composite parts may be laid up ply-by-ply on a tool referred to as a mandrel. The mandrel has a tool surface substantially matching the part which functions to shape the plies as they are laid up and compacted on the mandrel. In those cases where the tool surface is highly contoured and the layup is wrapped at least partially around the mandrel, the layup may become locked on the mandrel, making release and removal of the layup difficult.

In order to facilitate layup removal, mandrels have been devised that partially collapse or at least contract enough to change the shape of the mandrel. This change in shape creates a clearance between the tool surface and the layup that is sufficient to "unlock" the layup and allow it to be removed from the mandrel. One known type of collapsible mandrel requires the insertion of an expander into the interior of the mandrel. The expander comprises inclined blocks which engage opposing interior walls of the mandrel. Manual rotation of a threaded rod passing through the blocks causes the blocks to expand and apply outwardly directed pressure on the mandrel walls. The blocks are used to slightly expanded the mandrel so that a portion of the mandrel, sometimes referred to as a tool block, can be removed. With the tool block removed, the mandrel partially collapses to create the clearance needed to the release the layup.

The use of the expander described above may have several disadvantages. For example, the expander is relatively heavy and awkward to manipulate, requiring at least two operators to install and operate. Also, the installation and removal of the expander is time consuming, and its reliability is less than desired.

Accordingly, there is a need for a layup mandrel that includes a mechanism for changing the shape of the mandrel to allow removal of a ply layup, which allows quick layup release, is easy to use and reduces dependency on manual labor.

SUMMARY

According to the disclosed embodiments, a layup mandrel includes an internally mounted, power operated device for changing the shape of a mandrel shell on which a layup may be formed. The device is used to expand the shell so that a portion of the shell may be removed, allowing shell to partially collapse. This partial collapse reduces the dimensions of the mandrel, providing the clearance needed between the shell and the layup to release the layup from the mandrel. In one example, the device includes a power operated actuator and linkage which transmits forced generated by the actuator to internal walls of the shell, causing the shell to expand slightly. Internal mounting of the device within the mandrel, eliminates the need to install and remove a mandrel expander mandrel after each layup cycle.

According to one disclosed embodiment, a layup mandrel is provided comprising a shell having a tool surface on which composite plies may be laid up. The mandrel further comprises an actuator mechanism coupled with the shell for changing the shape of the shell. The actuator mechanism include a power operated actuator mounted within the shell, and linkage coupled between the actuator and the shell for expanding the shell. The linkage may include first and second pairs of pivotally connected links which transmit force generated by the actuator to the walls of the mandrel shell, expanding the shell walls outwardly. The shell includes a gap filled by a removable insert. Expanding the shell walls allows the insert to be removed, following which shell walls contract, allowing the layup to be removed from the mandrel.

According to another embodiment, a mandrel is provided having a changeable shape. The mandrel comprises a shell on which plies of composite material may be laid up. The shell includes a gap therein into which at least a portion of the shell may contract to change the shape of the shell and release the layup. The mandrel further comprises a removable insert for filling the gap, and a mechanism, including an actuator, inside the shell for increasing the size of the gap and allowing the insert to be removed from the shell. The shell includes an inside surface, and the mechanism for increasing the size of the gap includes an actuator and linkage coupling the actuator with the inside surface of the shell for expanding the shell.

According to still another embodiment, a method is provided of laying up a composite part. The method comprises providing a mandrel having an outer tool surface on which the composite plies may be laid up, and forming the layup over the mandrel by laying up composite plies on the tool surface. The method further comprises releasing the layup from the mandrel, including using an actuator to change the shape of the mandrel. Releasing the layup may include using the actuator to expand the mandrel, removing an insert from a gap in the tool surface where the mandrel is expanding, and contracting the mandrel after the insert has been removed. Releasing the layup may also include expanding links against inside surfaces of the mandrel using the actuator until the mandrel changes shape. The method may also include placing a layer of compressible material between the layup and the outer tool surface, and compressing the layer as the shape of the mandrel is changed.

According to another embodiment, a method is provided of changing the shape of the mandrel. The method comprises using an actuator to generate a force, and using links to apply the generated force to the sides of the mandrel. Using the actuator to generate the force may include pressurizing a pneumatic cylinder within the mandrel in order to displace one end of the links. Using the links to apply the force may include using the other end of the links to engage the sides of the mandrel.

BRIEF DESCRIPTION OF THE ILLUSTRATIONS

FIG. 11 is an illustration of a cross sectional view of an alternate mandrel shell having an oval cross sectional shape.

FIG. 12 is an illustration of a cross sectional view of another mandrel shell having a square cross sectional shape.

FIG. 13 is an illustration of a combined diagrammatic and cross sectional view of an alternate form of a collapsible mandrel.

DETAILED DESCRIPTION

Figure 1:
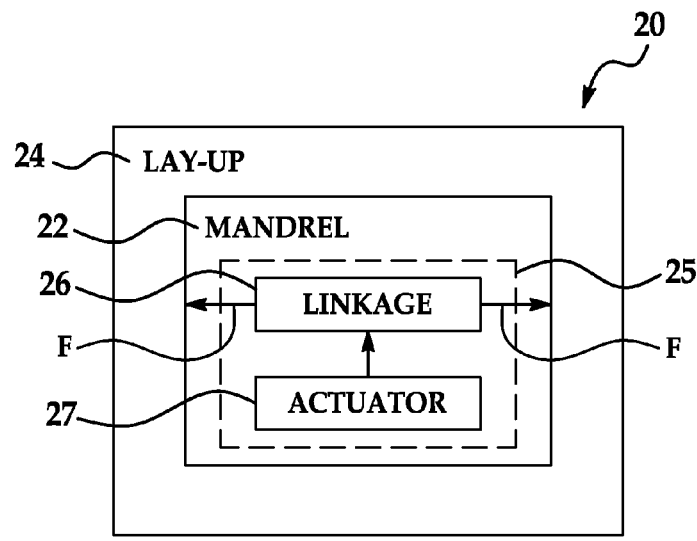
FIG. 1 is an illustration of a functional block diagram of a mandrel having a device for changing the shape of the mandrel.

Referring first to FIG. 1, the disclosed embodiments relate to tooling apparatus 20 broadly comprising a mandrel 22 on which a layup 24 may be formed, and a device 25 for changing the shape of the mandrel 22 in order to allow removal of the layup 24. The device 25 includes a power operated actuator 27 and linkage 26 mechanically coupling the actuator 27 with the mandrel 22. When energized, the actuator 27 displaces the linkage 26 to exert a force "F" on the interior walls (not shown) of the mandrel 22, causing the mandrel 22 to change its shape.

Figure 2:
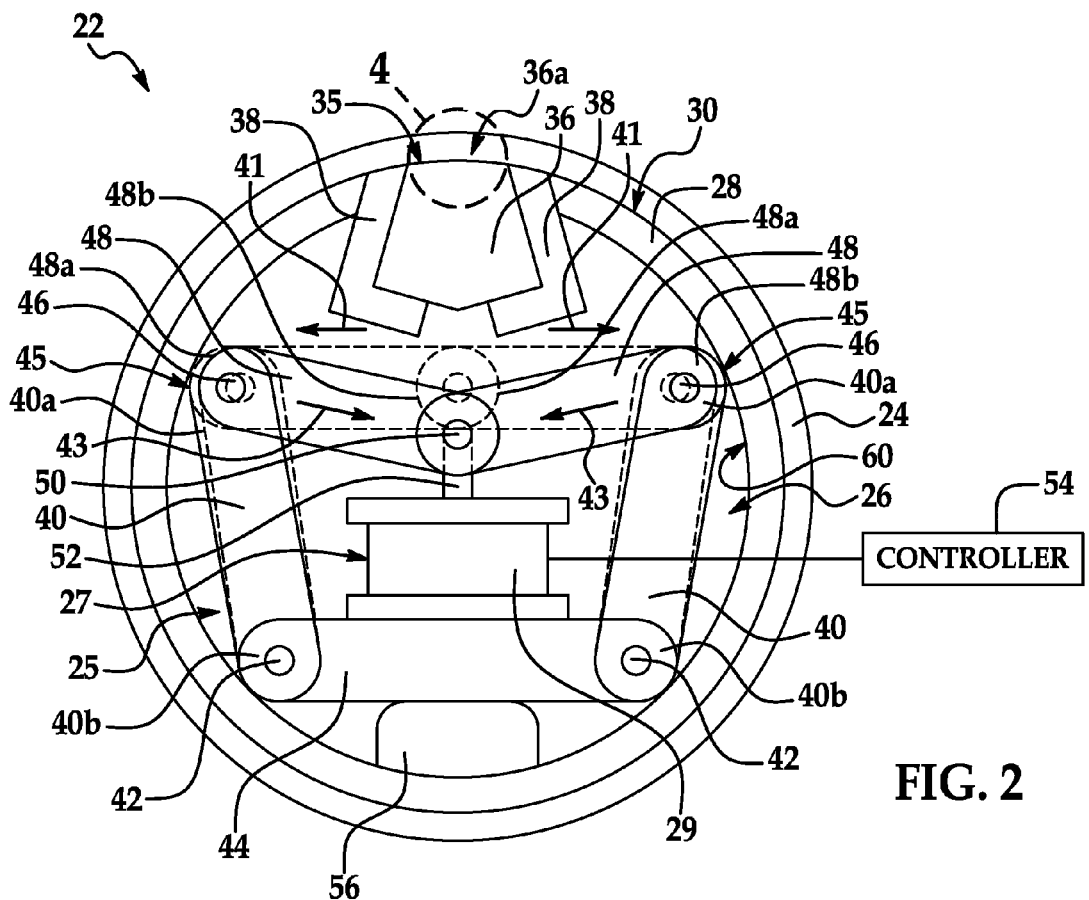
FIG. 2 is an illustration of a sectional view of the mandrel shown in FIG. 1, also depicting a controller.

Referring now to FIGS. 2-5, the mandrel 22 comprises a cylindrical shell 28 formed of any suitable material. In one embodiment, the mandrel shell 28 is formed of a spring metal such as aluminum however other materials which may deform and return to their original shape are possible. The shell 28 has a cylindrical outer tool surface 30 on which multiple plies 24a (FIG. 4) may be laid up to form a layup 24 conforming to the tool surface 30. While the shell 28 is shown as having a cylindrical shape in the illustrated embodiment, other shapes are possible, as will be described later in more detail. FIG. 2 shows a layup 24 having been formed completely around the circumference of the shell 28, however plies 24a may be laid up on the tool surface that only partially cover the circumference of the shell 28.

Figure 3:
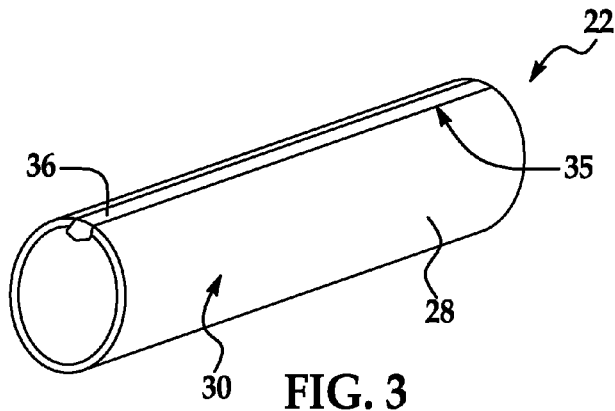
FIG. 3 is an illustration of a perspective view of the mandrel shown in FIG. 2, a layup and internal parts of the mandrel not shown for clarity.

The mandrel shell 28 includes a gap 35 extending longitudinally along its length, as shown in FIG. 3. As will be discussed below, the presence of the gap 35 allows the shell 28 to partially collapse into the gap 35 in order to unlock and release a completed layup 24 from the mandrel 22. The gap 35 is filled with a removable insert 36 having an outer tool surface 36a contoured to substantially match the curvature of the tool surface 30, effectively forming an extension of the cylindrical tool surface 30, and maintaining the desired shape of the shell 28. The insert 36, which is generally wedge shaped in cross section, is held in the gap 35 by a pair of opposing jaws 38 attached to or forming an integral part of the shell 28. The spring force of the shell 28 biases the jaws 38 toward each other, causing the jaws 38 to compress and hold the insert 36 in position. The outer tool surface 36a of the insert 36 remains substantially flush with the tool surface 30 during use of the mandrel 22 to form a layup 24.

As previously mentioned, the device 25 for changing the shape of the mandrel 22 comprises linkage 26 operated by an actuator 27. In the illustrated embodiment, only a single device 25 is shown, however, where the mandrel shell 28 is elongate as shown in FIG. 3, it may be necessary to employ multiple ones of the devices 25 along the length of the mandrel 22 which are operated in concert with each to change the shape of the shell 28 substantially all along its length. The actuator 27 is mounted on a fixed base 44 secured to an internal support 56 within the shell 28. The actuator 27 may comprise, for example and without limitation, a fluid operated cylinder 29 having an internal piston (not shown) connected to an output shaft 52. The fluid may comprise air, hydraulic fluid or another suitable fluid, controlled by a fluid controller 54 which pressurizes the cylinder 29 with the fluid. In one embodiment, the actuator 27 comprises a pneumatically operated "pancake" cylinder.

The linkage 26 comprises a first pair of elongate links 48 each having one end 48a thereof coupled with the output shaft 52 by means of a pivotal connection 50. The opposite ends 48b of the links 48 are respectively pivotally coupled with one end 40a of a second pair of elongate links 40 by means of pivotal connections 46. The other ends 40b of the links 40 are pivotally connected to the base 44 by means of pivotal connections 42.

When the actuator 27 is energized, linear displacement of the output shaft 52 causes links 48 to rotate about the pivotal connection 50 and move laterally outward, as shown by the arrows 41, in a direction traverse to the linear movement of the shaft 52, until the ends 48a of the links 48 contact and apply force to the inside wall 60 of the shell 28 at a contact area 45. Links 40 react a portion of the force generated by the actuator 27, rotating about pivotal connections 42, and function to guide the movement of links 48 so as to restrain such movement to substantially lateral movement toward the inside shell wall 60. The arrows 43 indicate the direction of movement of the links 48 when the actuator 27 is de-energized. As will be discussed below in more detail, the force applied to the inside wall 60 of the mandrel shell 28 by the links 48 causes the shell 28 to expand slightly, thereby increasing the size of the gap 35 so that the insert 36 may be removed from the mandrel 22.

Figure 4:
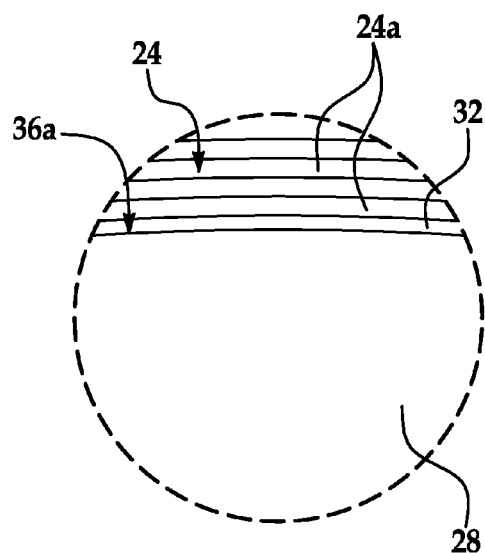
FIG. 4 is an illustration of an enlarged, cross sectional view of the area designated as FIG. 4 in FIG. 2.

FIG. 4 illustrates the use of a layer 32 of a compressible material such as a suitable plastic film that may be used to cover the tool surface 30, including the upper surface 36a of the insert 36. During the expansion of the mandrel shell 28 in preparation for removal of the insert 36, the layer 36 may compress slightly, for example, a few thousandths of an inch, so that minimal force is transferred to the layup 24. The compressible layer 32 may reduce the possibility of the expansion of the mandrel 22 altering the shape and/or dimensions of the layup 24 from desired specifications.

Figure 5:
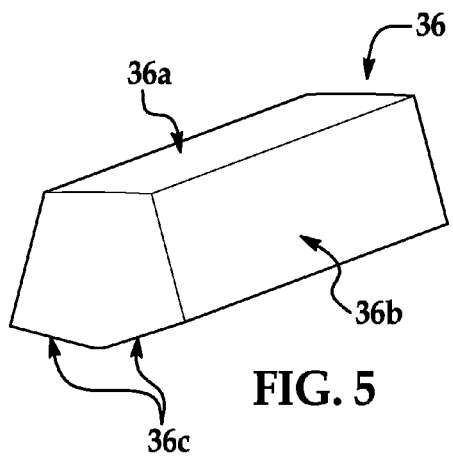
FIG. 5 is an illustration of a perspective view of an insert forming part of the mandrel shell shown in FIGS. 2 and 3.

FIG. 5 illustrates additional details of the insert 36. In this example, the insert 36 has a wedge-shape cross section and comprises, in addition to tool surface 36a, two opposing sides 36b and two adjacent sides 36c. The insert 36 may have other cross sectional shapes, depending upon the size and shape of the gap 35 (FIG. 3), the contour of the tool surface 30 and the configuration of the jaws 38.

Figure 6:
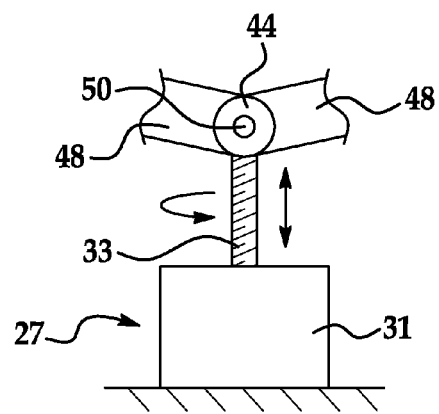
FIG. 6 is an illustration of a side view of an alternate form of the actuator.

While FIG. 2 illustrates the use of a fluid cylinder as an actuator 27, other types of actuators 27 are possible. For example, and without limitation, FIG. 6 shows an actuator 27 comprising an electric motor 31 having a screw drive output shaft 33 which is pivotally coupled with the links 48 by the pivotal connection 50. Rotation of the shaft 33 by the motor 31 linearly displaces the pivotal connection 50, in turn displacing the links 48. It may also be possible to employ a bladder-like pressure vessel (not shown) which may be pressurized to drive the links 48, or to apply pressure directly to the inside walls (FIG. 2) of the shell 28 in order to expand the shell 28.

Figure 7:
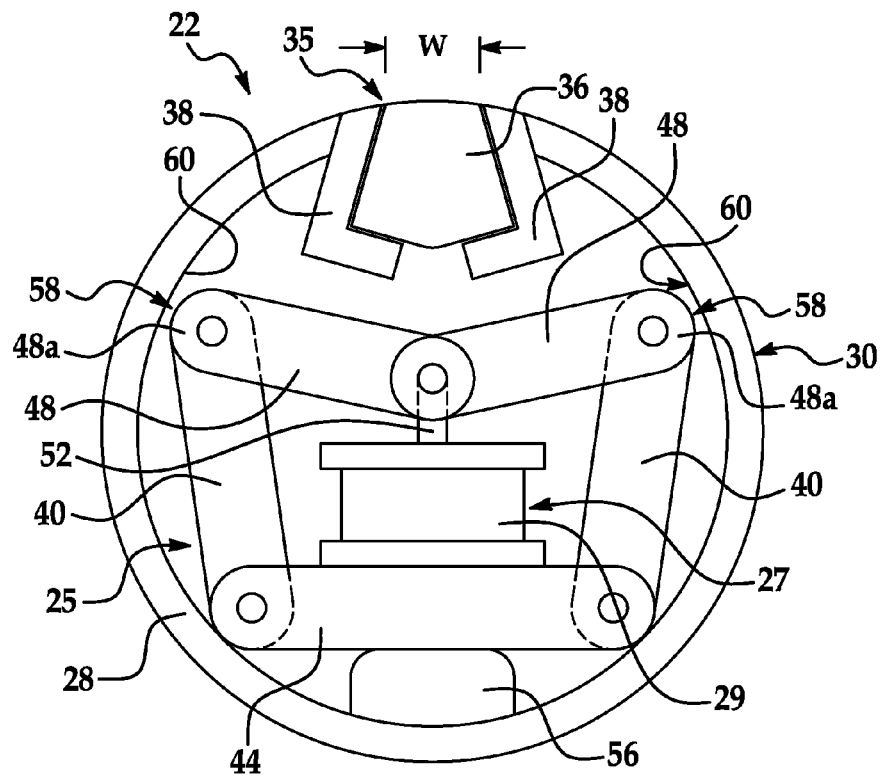
FIG. 7 is an illustration similar to FIG. 2, wherein the actuator is de-energized and the insert fills a gap in the mandrel shell.

FIG. 7 illustrates the actuator 27 in its de-energized state in which the output shaft 52 is withdrawn into the cylinder 29 and the outer ends 48a of links 48 are drawn inwardly away from contact at 58 with the interior wall 60 of the mandrel shell 28. In this condition, the spring force of shell 28 is transmitted through the jaws 38 to compress and thereby hold the insert 36 within the gap 35. The gap 35 has a width "W" when the insert 36 is installed. In the condition shown in FIG. 7, the mandrel is ready to have plies (not shown) laid up over the tool surface 30 after the compressible layer 32 (FIG. 4) has been applied to the tool surface 30.

Figure 8:
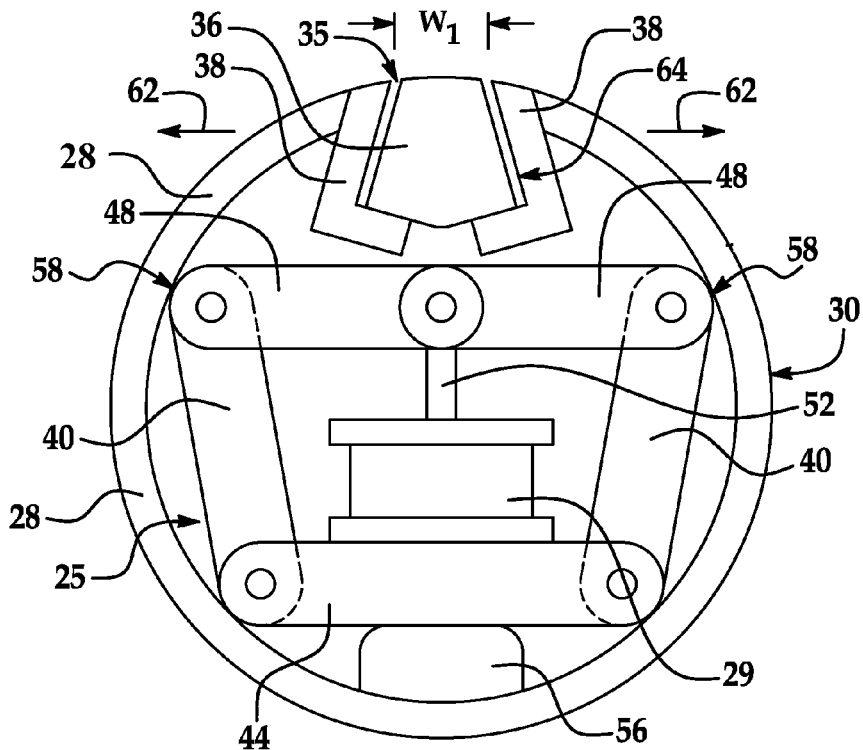
FIG. 8 is an illustration similar to FIG. 7 but showing the actuator having been energized and the sides of the mandrel shell having been expanded to allow removal of the insert.
Figure 9:
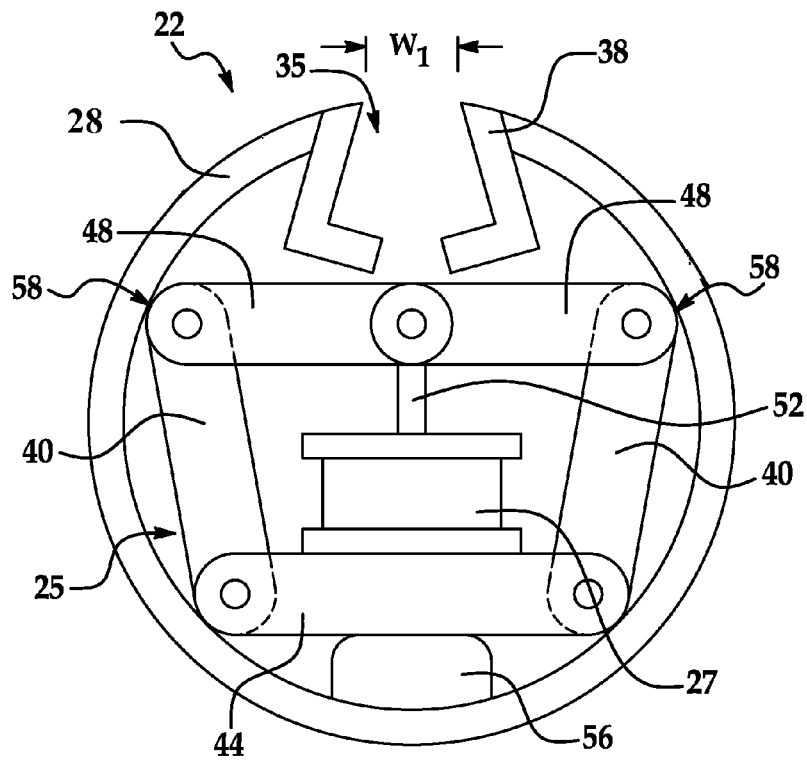
FIG. 9 is an illustration similar to FIG. 8 but showing the insert having been removed while the actuator remains energized and the mandrel shell is expanded.

FIG. 8 illustrates the condition of the mandrel 22 after a layup (not shown in FIG. 8) has been formed over the mandrel tool surface 30 and it is desired to remove the layup from the mandrel 22. The actuator 27 is energized, causing the outer ends 48a of links 48 to move outwardly into engagement at 58 with the inside wall 60 of the shell 28. As previously mentioned, force generated by the actuator 27 and transmitted through links 48 causes the shell 28 to expand, thereby increasing the size of the gap 35 to a width "$W_1$". Increasing the size of the gap 35 to "$W_1$" generates a clearance space 64 between the jaws 38 and insert 36 which allows the insert 36 to be withdrawn longitudinally from the mandrel 22. FIG. 9 show the actuator 27 energized, and the insert 36 having been removed either manually, or using automated equipment (not shown).

Figure 10:
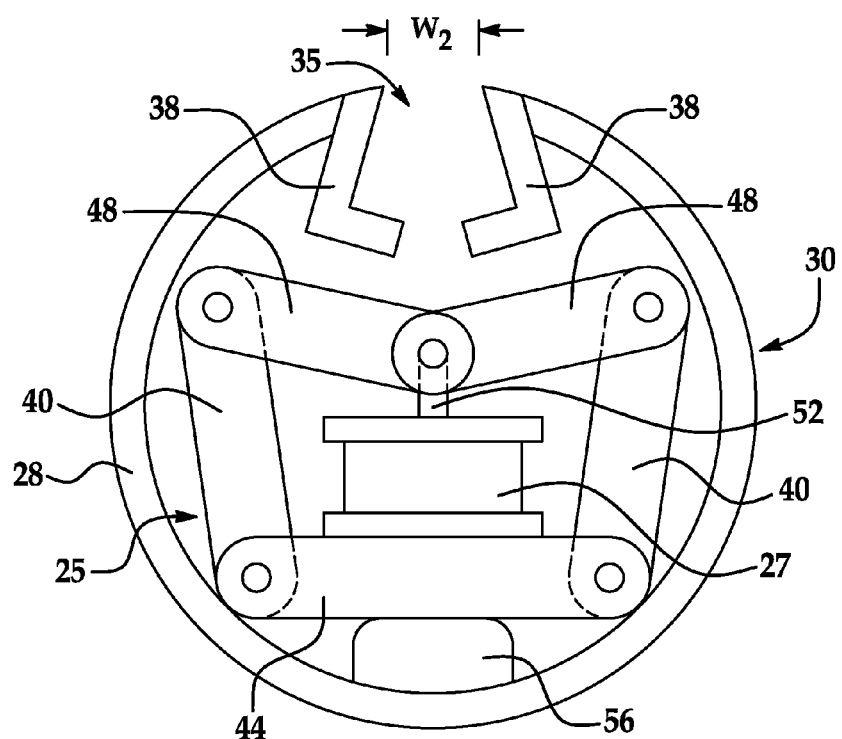
FIG. 10 is an illustration similar to FIG. 9 but showing the actuator having been de-energized and the shell partially collapsed.

Although in most production environments, the insert 36 may be reinstalled in the mandrel shell 28 after the layup 24 has been removed, it is possible in some applications that the insert 36 may not be reinstalled until a later time. FIG. 10 illustrates the condition of the mandrel 22 when the insert 36 has been removed, and the actuator 27 has been de-energized, allowing the shell 28 to partially collapse or contract so that the gap 35 is decreased to a width "$W_2$" which is less than dimension "W" (FIG. 7) when the insert 36 is installed.

As previously mentioned, while a cylindrically shaped shell 28 has been shown in FIGS. 2, 3 and 7-10, other shapes are possible. For example, FIG. 11 illustrates an oval shaped mandrel shell 66 having a gap 68 filled by an insert 36. FIG. 12 illustrates a square shaped mandrel shell 70 having a gap 68 filled by an insert 36. A mandrel shell having a tapered cylindrical shape (not shown) may be possible. Likewise, the mandrel shell may have a combination of shapes, such as the combination of a cylindrical shape and a spherical shape. A range of other polygonal shapes are possible, such as without limitation, rhombus, rectangles, trapezoids, parallelograms and others. The insert 36 may be placed at any of various locations in the mandrel shell other than at the location shown in the illustrated embodiment. Also, in some embodiments, the insert 36 may comprise two or more pieces (not shown), rather than being constructed as single piece as shown in the illustrated embodiments, while in still other embodiments, more than one insert 36 be used. It may also be possible to employ an insert 36 that is collapsible (not shown), which would allow the shell 28 to collapse, but which may not require the insert 36 to be removed from the shell 28.

FIG. 13 illustrates another embodiment of a mandrel 72 having a mandrel shell 74 comprising two halves 74a, 74b pivotally connected together by a hinge 76. The two mandrel halves 74a, 74b are biased and pivot toward each other about hinge 76 as shown by the arrows 80 by means of a spring 78 coupled between the shell halves 74a, 74b. In this example, the spring 78 biases the jaws 38 toward each other to hold the insert 36 during the layup process. The linkage 26 and actuator 27 are used to expand the shell 74 by overcoming the biasing force of the spring 78, causing the halves 74a, 74b to pivot slightly away from each other until insert 36 has been removed. With the insert 36 removed, the actuator 27 may be de-energized, allowing the spring 78 to draw the jaws 38 inwardly, thereby reducing the size of the shell 74 so that a layup (not shown) may be removed from the mandrel 72.

Figure 14:
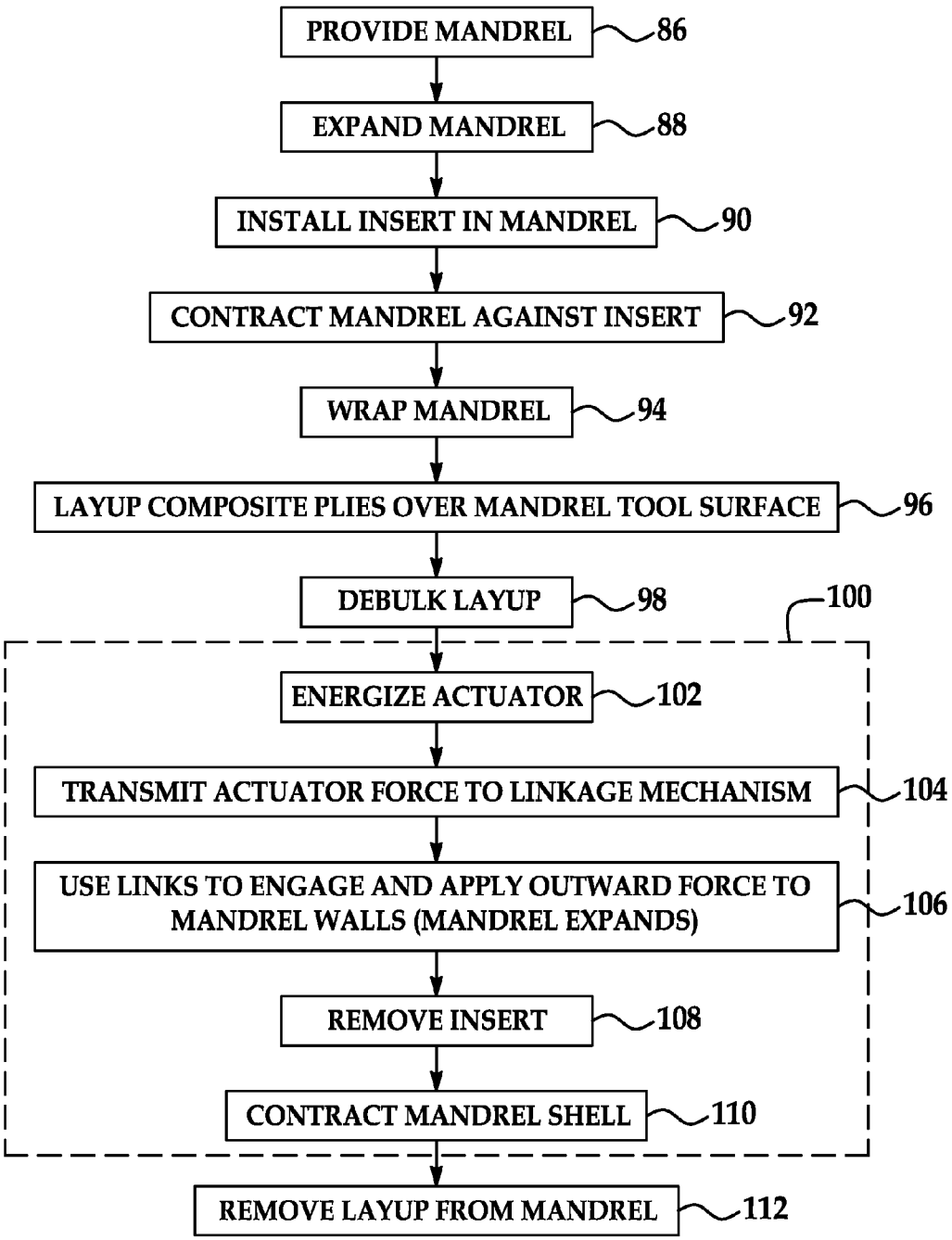
FIG. 14 is an illustration of a flow diagram of a method of using a mandrel having a changeable shape to layup composite parts.

Attention is now directed to FIG. 14 which illustrates the steps of a method of using the expandable mandrel 22 previously described to layup a composite part (not shown). Beginning at 86, a mandrel 22 is provided, and at 88, the mandrel 22 is expanded to allow installation of the insert at step 90. At step 92, the mandrel 22 is contracted against the insert 36, thereby holding the insert 36 in place so it forms a part of the tool surface of the mandrel shell 28. Next at 94, a layer 32 of compressible material is wrapped over the mandrel 22, following which composite plies 24a (FIG. 4) may be laid up over the mandrel tool surface 30 to form a desired layup 24. At 98, the layup is debulked using any suitable process such as, without limitation, vacuum bag processing. Although not shown in the Figures, it is possible that the mandrel 22 may also be used as a cure mandrel, in which case the layup 24 would be cured while on the mandrel 22 using a suitable cure process and equipment (not shown) after debulking at 98.

At 100, after debulking and/or curing, the shape of the mandrel 22 is changed in order to allow removal of the layup 24 from the mandrel 22. Changing the shape of the mandrel 22 at 100 begins with energizing the actuator 27 at 102, which results in the transmission of actuator force to the linkage 26 at 104. The linkage is used to engage and apply outward force to the mandrel wall 60 at 106, thereby causing the mandrel shell 28 to expand. At 108, with the mandrel wall 60 expanded, the insert 36 may be removed at 108, following which the mandrel shell 28 may contract at 110. With the mandrel shell 28 having been contracted to change the dimensions of the mandrel 22, the layup 24 may be removed from the mandrel 22 at step 112.

Figure 15:
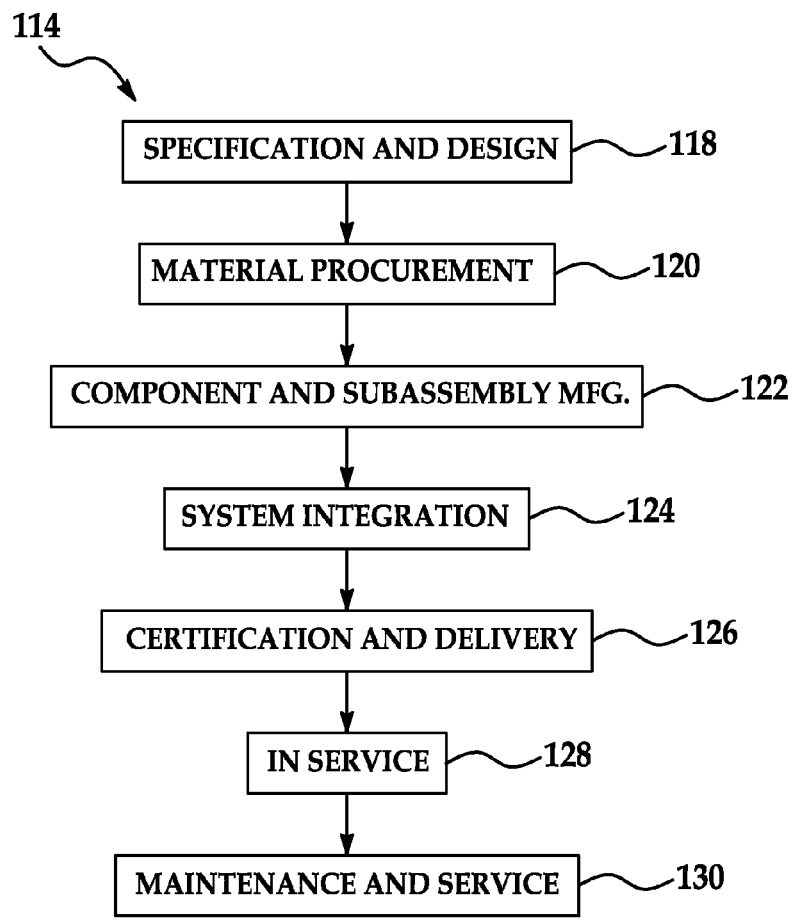
FIG. 15 is a flow diagram of aircraft production and service methodology.
Figure 16:
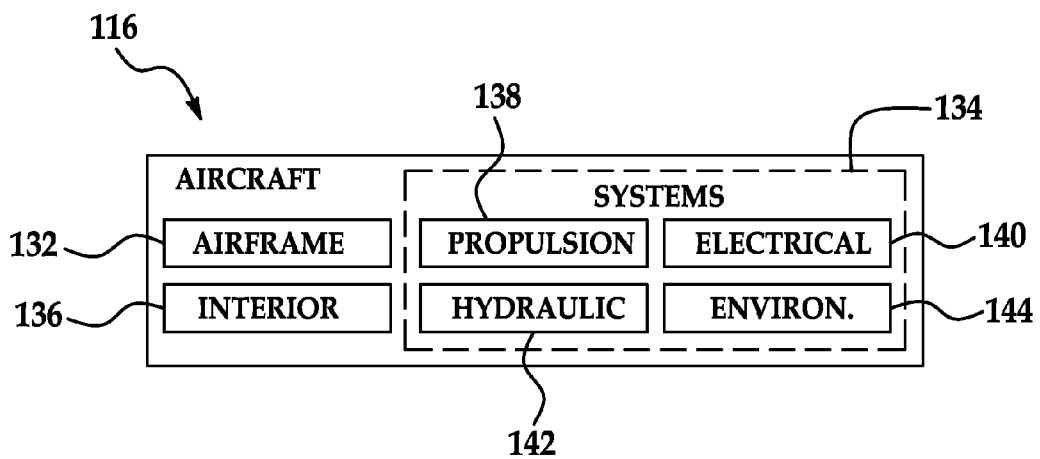
FIG. 16 is a block diagram of an aircraft.

Referring next to FIGS. 15 and 16, embodiments of the disclosure may be used in the context of an aircraft manufacturing and service method 114 as shown in FIG. 15 and an aircraft 106 as shown in FIG. 16. During pre-production, exemplary method 114 may include specification and design 118 of the aircraft 116 and material procurement 120. During production, component and subassembly manufacturing 122 and system integration 124 of the aircraft 116 takes place. During production, the disclosed expandable mandrel 22 may be employed to fabricate components used in processes 122 and 124. Thereafter, the aircraft 116 may go through certification and delivery 126 in order to be placed in service 128. While in service by a customer, the aircraft 116 may be scheduled for routine maintenance and service 130 (which may also include modification, reconfiguration, refurbishment, and so on, in which parts and components are used which are fabricated by the disclosed method and expandable mandrel.

Each of the processes of method 114 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 116 produced by exemplary method 114 may include an airframe 132 with a plurality of systems 134 and an interior 136. Examples of high-level systems 134 include one or more of a propulsion system 138, an electrical system 140, a hydraulic system 142, and an environmental system 144. Any number of other systems may be included. Although an aerospace example is shown, the principles of the invention may be applied to other industries, such as the automotive industry.

The apparatus embodied herein may be employed during any one or more of the stages of the production and service method 114. For example, components or subassemblies corresponding to production process 122 may be fabricated or manufactured in a manner similar to components or subassemblies produced while the aircraft 116 is in service. Also, one or more apparatus embodiments may be utilized during the production stages 122 and 124, for example, by substantially expediting assembly of or reducing the cost of an aircraft 108. Similarly, one or more apparatus embodiments may be utilized while the aircraft 116 is in service, for example and without limitation, to maintenance and service 130.

Although the embodiments of this disclosure have been described with respect to certain exemplary embodiments, it is to be understood that the specific embodiments are for purposes of illustration and not limitation, as other variations will occur to those of skill in the art.

What is claimed:

1. A layup mandrel, comprising:
   a shell having a tool surface on which plies may be laid up and a gap;
   an insert for filling the gap, the gap allowing contraction of the shell when the insert is removed to permit release of a layup formed on the shell; and
   an actuator mechanism coupled with the shell for changing a shape of the shell.

2. The layup mandrel of claim 1, wherein the actuator mechanism includes:
   a power operated actuator mounted within the shell for producing a force, and
   linkage coupled between the actuator and the shell for expanding the shell using the force produced by the actuator.

3. The layup mandrel of claim 2, wherein:
   the linkage includes links mounted within the shell, the links being laterally displaceable into engagement with the shell for expanding the shell, and
   the actuator includes an output drivingly coupled with the links and linearly displaceable in a direction generally traverse to a direction of displacement of the links.

4. The layup mandrel of claim 2, wherein the actuator is one of:
   a pneumatically powered cylinder,
   a hydraulically powered cylinder, and
   an electrically powered motor.

5. The layup mandrel of claim 2, wherein the linkage includes:
   a first pair of links each having first and second ends, wherein the first ends are coupled with the actuator, and
   a second pair of links each having first and second ends, the first ends of the second links being respectively pivotally coupled with the second ends of the first links, the second ends of the second pair of links being engagable with the shell for applying the actuator generated force to the shell.

6. The layup mandrel of claim 1, wherein:
   the shell includes a gap and an insert for filling the gap, at least a portion of the shell is flexible in the area of the gap and has a spring force compressing shell against the insert, and
   the actuator mechanism includes linkage for expanding the shell to relieve the compression force against the insert and allow removal of the insert.

7. The layup mandrel of claim 1, further including:
   a pair of jaws on the shell for gripping the insert.

8. The layup mandrel of claim 1, wherein the insert has a generally wedge shaped cross section and a surface forming an extension of the tool surface of the shell.

9. A mandrel having a changeable shape, comprising:
   a shell on which plies of composite material may be laid up, the shell including a gap therein into which at least a portion of the shell may contract to change the shape of the shell and release a layup;
   a removable insert held in the shell for filling the gap; and
   a mechanism including an actuator inside the shell for increasing a size of the gap and allowing the insert to be removed from the shell.

10. The mandrel of claim 9, wherein:
    the shell includes an outer tool surface on which the plies may be laid up, and
    the insert includes a tool surface for engaging a part of the plies.

11. The mandrel of claim 9, wherein the shell includes a pair of opposing jaws for holding and compressing the insert therebetween.

12. The mandrel of claim 9, wherein:
    the shell includes an inside surface, and
    the mechanism for increasing the size of the gap includes a linkage coupling the actuator with the inside surface of the shell.

13. The mandrel of claim 12, wherein the linkage includes:
    a first pair of links coupled with the actuator, and a second pair of links coupled with and driven by the first pair of links, each of the links in the second pair thereof including an end displaceable outwardly into contact with and applying force to an inside wall of the shell.

14. The mandrel of claim 9, wherein the actuator is a fluid powered cylinder.

15. The mandrel of claim 9, wherein the actuator is an electrically powered motor.

16. A layup mandrel having a changeable shape, comprising:
    a generally hollow, flexible shell having interior walls, the shell including a contoured outer tool surface over which composite plies may be laid up and a gap therein into which the walls may partially collapse;
    a base within the shell;
    a fluid operated cylinder mounted on the base and having a force transmitting, linearly displaceable output shaft;
    a first set of links each having a first end thereof pivotally coupled with the output shaft and having a second end thereof engageable with the inside walls of the shell for transmitting force from output shaft to the walls for expanding the walls;
    a second set of links each having a third end thereof pivotally coupled with the base and having a fourth end thereof pivotally coupled with the second end of one of the links in the first set thereof; and
    an insert removable installed in shell filling the gap for maintaining the shape of the shell.

17. A method of laying up a composite part, comprising:
    providing a mandrel having a shell with an outer tool surface on which composite plies may be laid up, a gap, and an insert for filling the gap, the gap allowing contraction of the mandrel when the insert is removed;

forming a layup on the mandrel by laying up composite plies on the tool surface;

releasing the layup from the mandrel, including using an actuator to change a shape of the mandrel.

18. The method of claim 17, wherein releasing the layup includes:

using the actuator to expand the mandrel, removing the insert from the gap in the tool surface when the mandrel is expanded, and contracting the mandrel after the insert has been removed.

19. The method of claim 17, wherein releasing the layup includes expanding links against an inside wall of the mandrel.

20. The method of claim 17, wherein releasing the layup includes using an actuator to expand links against the inside surface of the mandrel until the shape of the mandrel changes.

21. The method of claim 17, further comprising:

placing a layer of compressible material between the layup and the outer tool surface, and compressing the layer as the shape of the mandrel is changed.

22. A method of changing a shape of a mandrel in order to release a composite layup from the mandrel, comprising:

providing a mandrel shell having a gap therein;

installing an insert in the gap for maintaining the shape of the mandrel;

energizing an actuator within the shell to produce a linear force;

transferring the linear force to a first set of links;

using the transferred force to displace the first set of links into engagement with inner walls of the shell;

using a second set of links to guide the displacement of the first set of links;

using the force applied to the inner walls of the shell by the first set of links to expand the shell and increase a width of the gap an amount sufficient to allow removal of the insert;

removing the insert from the gap;

de-energizing the actuator; and allowing a spring force in the shell to collapse a portion of the shell into the gap and change a shape of the shell an amount sufficient to unlock the layup.

* * * * *